United States Patent [19]

Lavendel et al.

[11] Patent Number: 4,689,104

[45] Date of Patent: Aug. 25, 1987

[54] METHOD OF BONDING TWO SUBSTRATE FACES UTILIZING BORON-SILICON-HYDROGEN ALLOY FILMS

[75] Inventors: Henry W. Lavendel, Palo Alto; John C. Robinson, Cupertino, both of Calif.

[73] Assignee: Lockheed Missiles & Space Company, Inc., Sunnyvale, Calif.

[21] Appl. No.: 747,635

[22] Filed: Jun. 24, 1985

[51] Int. Cl.$^4$ ............................................. B32B 31/06
[52] U.S. Cl. ...................................... 156/325; 156/89; 156/150; 156/151; 427/248.1; 427/255; 427/255.1; 427/255.2
[58] Field of Search ................. 156/89, 150, 151, 325; 228/121, 122, 124, 194, 195, 198; 427/248.1, 255, 255.1, 255.2

[56] References Cited

U.S. PATENT DOCUMENTS 3,197,858  8/1965  Feduska et al. ...................... 228/194
3,455,745  7/1969  Kern et al. ........................ 427/255.2

Primary Examiner—Caleb Weston
Attorney, Agent, or Firm—Richard H. Bryer

[57] ABSTRACT

Hydrogenated boron-silicon alloy films having unexpected properties permitting in one embodiment the bonding together of metal and ceramic substrates by coating the surfaces to be bonded with the film mating the surfaces and heat treating the mated surfaces to expell hydrogen therefrom and to react to resulting boron-silicon alloy film with the substrates to form a liquid reaction product which forms a surface bond with the substrates or is at least partially absorbed in the substrates. In another embodiment, at least one surface of an intermetallic compound formed from elements selected from groups III and V of the periodic table is sealed against structural degradation by forming on the surface a solid boron-silicon-hydrogen alloy film. In still another embodiment, metal and organic resin substrates are protected against attack by water vapor, dissociated oxygen and molecular oxygen by forming a solid boron-silicon-hydrogen alloy film on the substrates. The mtal substrates are further protected against deterioration by the effects of the recombination of dissociated oxygen and nitrogen by converting the solid boron-silicon-hydrogen alloy film to solid boron-silicon oxide film.

4 Claims, No Drawings

METHOD OF BONDING TWO SUBSTRATE FACES UTILIZING BORON-SILICON-HYDROGEN ALLOY FILMS

TECHNICAL FIELD

This invention relates to hydrogenated boron-silicon alloy films having unexpected properties permitting the bonding together of various metal and ceramic substrates, the protecting of various metal and organic resin substrates against attack by atmospheres containing dissociated oxygen, molecular oxygen, water vapor and dissociated oxygen and nitrogen, and the sealing and stabilizing of intermetallic compounds against structural degradation.

BACKGROUND ART

Solid amorphous silicon-boron-hydrogen alloy films have heretofore been utilized as electronic materials; see, "Fundamentals of Solar Cells", chapter 11 section 2, Alan L. Fahrenbruch and Richard H. Bube, Academic Press 1983. Most commonly they are used in the form of deposits, prepared by radio frequency glow discharge decomposition of hydrides, in solid state devices converting solar radiation to electrical energy. Preparation and electrical current-voltage characteristics of semiconductor junctions made of thin films of amorphous silicon doped with trace amounts of boron are described by W. E. Spear, P. G. Le Comber, S. Kinmond and M. H. Brodsky, "Amorphous Silicon p-n Junction", Applied Physics Letters, Vol. 28, No. 2, pg. 105, Jan. 1976. In this work, the fact that materials prepared by decomposing the hydride gases always contain hydrogen, and the role that this hydrogen plays in forming the amorphous structure advantageous for electronic applications, were not considered. Hydrogen content and bonding configurations and their influence on growth and structure of amorphous silicon films prepared by decomposition of silane have been examined by J. C. Knights, "Growth Morphology and Defects in Plasma-Deposited a-SI: H Films", Journal of Non-Crystalline Solids, Vol. 35 & 36 (1980), pages 159-170.

The high efficiency of solar cells incorporating thin films of hydrogen-containing amorphous silicon-boron has motivated scientific interest in the solid state physical properties of compositions exceeding in boron content the low concentrations utilized for semiconductors. For example, C. C. Tsai in an article entitled 'Characterization of Amorphous Semiconducting Silicon-Boron Alloys Prepared by Plasma Decomposition" published in Physical Reviews, Volume 19, page 2041, February 1979, describes structure, optical absorption, electrical conductivity and paramagnetic resonance of hydrogenated boron-silicon alloys, ranging in composition from 0 to 100% boron. In this work, films deposited by glow discharge decomposition of Si $H_4+B_2H_6$ gas mixtures on a variety of substrates, including glass, aluminum, crystalline silicon, and saphire have been studied. The relative efficiency of incorporation of boron from the gas into the film, compared to that of the silicon, is about 0.65+ or −0.15 at 270° C. deposition temperature. Therefore, amorphous hydrogenated silicon-boron alloys with any composition in the binary system can be made by properly choosing the Si $H_4$—$B_2H_6$ gas mixture. The hydrogen content in the films has been found to range between 10 and 45 atomic percent depending on the deposition parameters. In the film structure, hydrogen forms B-H and Si-H bonds which represent the majority of the amorphous atomic lattice. The structure and stability of the films depend in great measure on the deposition temperature. Films deposited at 270° C. are dense, contain less than 1 atom percent of oxygen and are very stable to exposure to ambient air. They loose their hydrogen when heated to about 350° C. to 550° C. In contrast, films deposited at 25° C. are porous, easily oxidize upon exposure to air, and start loosing their hydrogen near 350° C.

In the current electronic art, also pyrolysis, or thermal decomposition, of gaseous hydrides is practiced for preparation of amorphous hydrogen-containing silicon and boron films. An example is the work of B. G. Bagley, D. E. Aspnes, A. C. Adams and R. E. Benenson described in the paper entitled "Optical Properties of LPCVD aB(H)" published in the Journal of Non-Crystalline Solids, Vol. 35 & 36 (1980), page 441. The paper reports the infra red and near ultra violet absorptions of films deposited on single crystal silicon substrates by pyrolysis of diborane at temperatures between 290° C. and 400° C. The films have remained stable upon exposure to laboratory atmosphere for six months without any degradation by oxidation.

Applicants are unaware of any other uses set forth in the prior art for silicon-boron-hydrogen alloys. Such alloys have been studied, developed and used exclusively for the purpose of utilizing their physical behavior as electronic semiconductors. The only chemical aspects of these materials that are recognized by the electronic art are the reactions occurring in the process of their fabrication as solid thin films, by decomposition of gaseous silicon and boron hydrides (silanes and boranes). Accordingly, the prior art teaches the composition and pressure of the gases from which the films are formed and the resulting film compositions, temperature and rate of their nucleation and growth, atomic lattice structure and stability to temperature and exposure to ambient air. The art also implies that the silicon-boron-hydrogen films can be deposited on almost any and all known solid substrates including metals, ceramics and organic resin materials. However, the art is devoid of any teaching or consideration of the chemical behavior of the films towards the substrate on which they have been deposited and towards materials which come in contact with them from the outside.

In a nonanalogous art of joining a specific material to itself or to other materials, a structural transition interface is utilized between the materials. This transition interface is created on atomic and crystal lattice levels by direct chemical reactions between the two surfaces in processes such as diffusion or fusion welding or bonding. In many instances, for convenience of lower bonding process temperatures, an intermediate filler material is interposed between the two surfaces to interact with each one of them separately and thus bond them together. Examples of this kind of state of the art processes are arc welding, brazing, soldering, and organic adhesive bonding. All these chemically generated bond interfaces create a region of transition in which the interfaced composition and crystalline structures are forced to adjust to each other. Particularly in the cases of soldering, brazing and adhesive bonding the filler material is retained at the joint and constitutes an additional adventitious material in the joined assembly. In general, the chemical and physical characteristics of the transition region are quite different from those of the bonded materials and pose problems and disadvantages of diminished mechanical strength, sensitivity to thermal or mechanical shock, or to chemical attack, undesirable electrical or thermal conductivity, and the like.

Advantages of using boron and/or silicon as active reactants in creating bonds between metals have been recognized by the current art, as shown, for example, in U.S. Pats. Nos. 2,714,760; 2,868,639; 3,188,203; 3,530,568 and 3,678,570. These patents teach joining high temperature corrosion and oxidation resistant iron, nickel and cobalt base alloys by means of brazing compositions based on nickel-chromium, or nickel-cobalt-chromium, to which boron, or boron and silicon, are added. Boron and/or silicon lower the melting point of the brazes and, thus, the joint can be made at temperatures low enough to avoid deteriorating the mechanical properties of the bonded alloys. Further advantage of using boron and silicon in the brazes is that although they act to generate a brazing liquid at a conveniently low temperature, they also at the same time tend to diffuse out of the bond into the metal and cause the liquid braze bond to solidify. In this way, the remelt temperature of the braze is raised above that of the original braze composition and the bonded assembly can be put to use at desirably high temperatures. However, the use of boron and silicon in this manner does not obviate the aforesaid difficulties associated with prior art bonding techniques.

DISCLOSURE OF INVENTION

Briefly, in accordance with the invention, it has been discovered that boron-silicon-hydrogen alloys, formed by conventional processes, have unobvious chemical and structural properties which yield unexpected results when applied as surface coatings or films to various metal, ceramic, intermetallic and organic resin substrates.

More particularly, the alloys permit the forming of metal to metal, ceramic to ceramic and metal to ceramic joints, the protection of metallic and organic resin substrates against atmospheres containing dissociated or molecular oxygen and nitrogen, oxygen, water vapor and the sealing of the surfaces of intermetallic compounds formed from elements selected from groups III and V of the periodic table against structural degradation.

The bonding of metal and ceramic substrates is accomplished by forming the solid boron-silicon-hydrogen alloy coating or film on the surfaces to be joined. The film is heated at temperatures sufficient to expell hydrogen from the film and to react the remaining activated boron-silicon bonds with metal and ceramic substrates to form, respectively, liquid metal-boron-silicon eutectic alloys and liquid borosilicate glasses which chemically interact with the mated surfaces to generate the bond. The chemical interaction might be limited to surface wetting and involve only superficial layers of the material but in most cases the eutectic alloys and the borosilicate glasses are at least partially and preferably essentially fully absorbed by the substrates. To promote glass formation in the reaction of the boron and silicon with the ceramic substrates, the heating is done in an atmosphere containing oxygen, such as ambient air. In the case of metal to ceramic bonding, the liquid metal-boron-silicon eutectics are chemically active towards most ceramic surfaces, particularly those containing oxygen. Upon completion of the heat treatment, the liquid phase components and the substrate components adjoining the mated surfaces have formed chemical bonds at the joint interface and in many cases have at least partially and preferably essentially fully exchanged places resulting in a high structural quality joint. The metal substrates utilized are those which form with the activated boron-silicon alloy a liquid ternary metal-boron-silicon eutectic and which desirably have at least a limited solubility for boron and silicon. The ceramic surfaces utilized are those which are able to form in oxygen-containing atmospheres a chemical bond with liquid borosilicate glasses and which desirably have at least a limited solubility for boron and silicon oxides.

The chemical stability of the as-formed boron-silicon-hydrogen alloy is the only property necessary for the sealing of intermetallic compounds and the protection of metal and organic resin substrates against attack by dissociated oxygen, molecular oxygen and water vapor. No further treatments of the film are necessary to achieve these results.

Protection of metal and organic resin substrates against deterioration by the effects of recombination of dissociated oxygen and nitrogen obtains with the as-deposited boron-silicon-hydrogen coating as well as with coatings which have been converted to boron-silicon oxides prior to exposure to such atmospheres.

BEST MODE OF CARRYING OUT THE INVENTION

Hydrogen contributes two different chemical properties to boron-silicon-hydrogen films both properties being important to achieving the various utilities of the invention.

For the purposes of protecting and sealing various materials, hydrogen confers to the films a chemical stability in the temperature range where the films retain hydrogen in their composition. For joining and bonding purposes, expulsion of hydrogen from the films enhances the heretofore unrecognized chemical reactivity of the films because the boron and silicon left behind find themselves in a state of unsaturated chemical bonds and thus activated to find new chemical associations.

In that embodiment of the invention pertaining to the bonding or joining of materials, the materials are put in contact with each other along surfaces coated with a solid boron-silicon-hydrogen alloy film of the invention. This joint is heated at temperatures sufficient to expell hydrogen from the film and to react the remaining activated boron and silicon bonds with metal including metal alloy surfaces and ceramic surfaces to form, respectively, liquid eutectic alloys and liquid borosilicate glasses which form a surface bond with, or are at least partially and preferably fully absorbed into the bulk materials.

More particularly, this mechanism involves heating the solid film of the invention to a temperature at which hydrogen bonds with boron and silicon are ruptured and hydrogen is expelled from the film. Boron and silicon then find themselves in a state of unsaturated chemical bonds and thus activated to generate new chemical associations. In particular, the now activated boron and silicon react at readily determinable temperatures to form liquid phase eutectics with the important engineering metals and alloys such as aluminum, copper, iron, nickel and cobalt. In similar manner, the activated boron and silicon combine with oxygen in an oxygen-containing atmosphere to form on ceramic substrates borosilicate glasses which are fluid at temperatures considerably lower than the melting points of most of the technologically important ceramics.

Therefore, for metal and metal alloy surfaces, the solid boron-silicon-hydrogen alloy film is first converted to a solid boron-silicon alloy film which reacts with the substrate to form a liquid eutectic. A ceramic surface coated with the boron-silicon-hydrogen film is likewise converted to the boron-silicon alloy film which reacts with oxygen at temperatures of formation of liquid borosilicate glasses.

An optimum bond is ensured when the components of the substrates that are to be joined diffuse across the bond and merge the two structures together. It is well understood by the art that chemical reactions and diffusion are enhanced in a liquid medium, in this case liquid eutectics and liquid glasses. The most desirable diffusive reaction occurs for full dissolution of the liquid eutectic and liquid glass in the substrates. The mechanism of dissolution is that of absorbing the dissolving species into the substrate atomic lattice and is connected with enhanced atomic movement where the liquid phase components and the substrate components exchange places in the crystal lattice. This mechanism results in a direct bond between the atoms of the two substrates while the liquid components are absorbed by dissolution.

The structural quality of joints made by films of the invention is promoted by the fact that conventional processing of film deposition by chemical absorption from a gas allows for easy control of the deposit thickness and, thereby, of the amount of the reactive material which generates the joint. In this way, only the minimum amout necessary to achieve the desired reaction is used. Increasing the film thickness above this amount necessitates either higher temperatures or longer times to promote full dissolution of the liquid components into the substrates. Less than full dissolution that is retaining increasing thickness of the liquid components between the substrates after completion of processing, increasingly weakens the joint. What is an actual thickness of remaining material excessive for the desired joint is a function of the nature of the joint materials and readily determinable by one of ordinary skill in the art.

The invention produces a true integration of the joined materials on the atomic crystalline structure level in the case of metals which are capable of dissolving in solid solution elemental boron and silicon and in the case of ceramics which are capable of dissolving in their structure boron and silicon oxides. The invention is not so limited, however, and has useful applicability to metals and ceramics which have a limited solubility for boron and silicon. For metals, intermetallic boride and silicide compounds are formed by reactions with the liquid phase at the joint interface. In most cases, these compounds tend to remain at the joint location because they are thermodynamically stable and affected very little by the diffusive matter transport mechanism. Similarly, a borosilicate glass bond residue is retained at the joint with ceramics which have limited tendency of dissolving boron and silicon oxides in their structure. The influence of these segregations on the structural properties of the joints is restricted, however, because of the small amount of the boron and silicon participating in the bonding process.

The affinity of boron and silicon towards both metals and oxygen is also advantageous for joining metals to ceramics. Here, the liquid metal-boron-silicon eutectics are chemically active towards most ceramic substrates, particularly those containing oxygen, and easily wet and bond to the ceramics.

Another novel chemical use of the boron-silicon-hydrogen films of the invention is for the sealing, that is preserving, the chemical bonds and atomic lattice of surfaces of intermetallic compounds such as gallium arsenide, selected from the compounds formed between elements belonging to groups III and V of the periodic table.

In the process of deposition by decomposition of a borane-silane gas mixture, the deposited solid boron-silicon hydrogenated alloy film bonds with the external, unsaturated chemical valencies at the substrate surface. The film does not disrupt or break the bonds of the underlying atomic lattice layers of the bulk material. At the deposition temperature, which is below the hydrogen evolution temperature of approximately 350° C., reaction of the film with the diffusion into the bulk material is essentially precluded.

Among the various utilities for this type of surface sealant is its use as an intermediate protective layer when it is necessary to provide on the intermetallic compound surface a layer of another material without interfering with the atomic lattice of the compound. At temperature below formation of liquid phase but above that of hydrogen evolution, the deposited hydrogenated film converts to the solid boron-silicon alloy film which is still effective in protecting the underlying intermetallic surface.

The chemical stability of the as-formed film is the only property necessary for this embodiment of the invention and no further treatment is necessary to achieve this result.

A further novel chemical use of the hydrogenated films of the invention is the protection of metallic and organic resin substrates against harmful attack by atmospheres containing dissociated oxygen, molecular oxygen, water vapor and dissociated oxygen and nitrogen.

Suitable metallic substrates are those containing iron, nickel, cobalt, chromium and aluminum, for example, nickel or iron base high temperature alloys such as Inconel 617 and MA 956, and titanium. Suitable organic resin substrates are those that do not deteriorate during film formation, for example, kapton.

For applications for protection against attack by dissociated oxygen in, for example, the upper earth atmosphere, molecular oxygen and water vapor, the films are used as deposited, needing no further thermochemical treatment to accomplish their function. Their as-formed chemical stability is the only property necessary for these embodiments of the invention.

For protection of metallic substrates against deterioration by the effects of recombination of dissociated oxygen and nitrogen species generated, for example, at the surface of a body reentering earth atmosphere, the films are converted to boron-silicon oxides by the atmospheric oxygen under heat generated by friction at the surface against the atmosphere. The boron-silicon oxygen compound layer so formed is also protective against oxidation of the substrate for a limited amount of time during reentry. For applications where it is necessary to first form an oxide layer on the surface of the reentry body or shield to insure it has desirable heat emissivity during reentry, it is convenient to convert the as-deposited boron-silicon-hydrogen film to boron-silicon oxides by heat treatment in air, for example at 1000° C. for one hour.

The boron-silicon-hydrogen films of the invention are formed by conventional techniques well understood by the art. Illustrative of such techniques are the methods used by C. C. Tsai, cited previously, and U.S. Pat. No. 4,064,521. These processes involve subjecting to a glow discharge a mixture of silicon and boron hydride gases (silane and borane) carried in an inert gas carrier such as argon at a pressure which ranges between 0.1 and 10 torrs. Electrons emitted from the electrodes in the discharge ionize and dissociate the hydride molecules which are attracted to the substrate to form the silicon-boron-hydrogen deposit.

The preferred method of the film deposition for the practice of the invention is by thermal decomposition of the hydride gases. It is chosen over the glow discharge, or plasma, activated processes generally utilized by the electronic technology because it is less dependent on the geometry of the substrate. The flow discharge activation is produced by electrons generated from gases ionized in an electric field created between two electrodes, one of which is, most commonly, the substrate itself. Therefore, the best results in terms of uniform coverage of the substrate surface are secured with flat surfaces directly exposed to the discharge. Thermal activation, on the other hand, is effected over all the external substrate surfaces uniformly heated at the process temperature.

In the preferred method of the invention, the silicon-boron-hydrogen films are formed by adsorption on chemically active surface sites of hydrogen-silicon and hydrogen-boron complex molecules generated by thermal decomposition, at a pressure of 1 atmosphere, of a mixture of silane ($SiH_4$) and diborane ($B_2H_6$) gases contained in a hydrogen carrier. At the temperature of the process, which is maintained between 200° C. and 350° C., the adsorbed species are mobile and diffuse along the surface such that the coverage is independent of the substrate geometry. Since the coating is formed by chemisorption, it becomes bonded only to the atomic, or molecular, layers which physically constitute the surface, and, at the low deposition temperature, it is prevented from forming compounds with, or diffusing into, the substrate. Therefore, the deposition by low temperature chemisorption from a gas medium accomplishes two purposes important for the embodiments of the invention: uniformity of coverage independent of the complexity of the surface geometry and sealing of the substrate surface with a film of a highly reactive composition.

The deposition is carried out from a flowing stream of the gas fed at atmospheric pressure into a reaction chamber containing the substrate heated to the process temperature which is kept between 200° and 350° C. Below 200° C. the process is slow and produces non uniform powdery deposits, above 350° C. the composition of the film becomes unstable due to loss of hydrogen. The films best suited for the purposes of the invention are prepared at about 250° C. Prior to initiating the deposition, the reaction chamber is evacuated, heated under vacuum to the process temperature and then purged with pure nitrogen for one hour. After purging, the reactive gas is admitted and kept flowing at the desired rate for the duration of the treatment. The temperature usually rises spontaneously at the beginning for a short time due to the exothermic nature of the adsorption of the first layer of the coating. After that the temperature falls down agains and remains stable while the film's thickness increases to its final level. After the film has attained its full thickness, the reactive gas mixture is replaced with nitrogen, the chamber is cooled down under the flow of nitrogen to ambient temperature and the coated substrate is taken out. Due to chemical stability at low temperatures, the storage of as coated articles under ambient conditions does not pose aging and deterioration problems.

The composition of the gas feed for the film deposition and the duration of the deposition depend on the embodiment of the invention for which the film has been prepared. The gas feed is made up of two components: a mixture of about 2% silane ($SiH_4$) and about 98% hydrogen and a mixture of about 1% diborane ($B_2H_6$) and about 99% of hydrogen. These two components are mixed together prior to being admitted to the reaction chamber by feeding them each at a different rate through a mixing flowmeter. For all the above invention embodiments, except for ceramic to ceramic bonding, the optimum flow measured in cubic centimeters per minute has been found to be 15cc of borane-hydrogen mixture and 385cc of silane-hydrogen mixture. Conditions for bonding ceramics which require formation of borosilicate glasses are 105cc of borane-hydrogen and 210cc of silane-hydrogen. The time of treatment for all five embodiments of the invention is the same, about 20 minutes. It produces a film between 1.0 and 1.5 micrometers thick. This thickness has been found satisfactory in all cases.

In preparation for film deposition, the surfaces are cleaned with appropriate commercial solvents or soap solutions to remove impurities and grease. Metals are additionally pickled and smut is removed by such procedures as normally applied in industrial practice prior to any coating process.

The most efficient bonding of metals obtains when the bond interface is liquid during the process. Although solid state diffusion bonds can be made using the films of the invention, they might require excessively high temperatures and long times. The invention is accordingly best suited for those cases where at least one of the materials being joined is able to react with the film to produce a low-melting phase, i.e., melting at a temperature low enough not to impair the properties of the materials during the joining operation. The invention, therefore, is most advantageous when applied to metals containing in their compositions such elements as gold, silver, copper, iron, nickel, or cobalt, all of which react with either or both boron and silicon to generate liquid eutectic phases at temperatures not higher than 1200° C. These metals can be joined to themselves, to each other, to other metals and to oxide ceramics by depositing on them the film of the invention, putting them in contact with the surface to which they are to be joined under a pressure of a few pounds per square inch and heating the assembly to a temperature between 10° C. and 50° C. above the respective eutectic temperature in an inert atmosphere, or vacuum, to prevent oxidation. The eutectic temperatures of interest are easily found in scientific and technical literature. The time of heating is chosen according to the structure expected for the joint. The best procedure is to determine by experiment the structure best suited for each case. In general, the increase of time at joining temperature will increase the difffusion effects producing dissolution of boron and silicon away from the joint interface and grain growth across the bond. The bond between ceramics using conversion of the boron-silicon-hydrogen films into a borosilicate glass is made by heating the assembled joint in air at illustrative temperatures of about 1200° C. and 1300° C.

To make the joints of the invention, it is not necessary to coat both surfaces which are to be bonded together with the boron-silicon-hydrogen film. It is sufficient to deposit the film only on one surface. Joining different materials, it is advantageous to put the film on the material which has the better affinity to react with the film and generate the bond-forming phases such as the liquid eutectic. However, from the point of view of protecting the surfaces from deteriorating by exposure to ambient air prior to making the joint, it is desirable to have both of the surfaces coated because the film is an efficient protection against oxidation, even by humid atmosphere. Several examples are given to illustrate the preparation and characteristics of the hydrogenated boron-silicon alloy films of the invention.

EXAMPLE 1

Boron-silicon-hydrogen film was used to bond together two pieces of mild steel (SISI-SAE type 1020). The surfaces were ground flat on a fine emery paper and etched by immersion for 30 seconds in an acid solution composed of 17 volume percent hydrofluoric acid, 44 to 55% concentrated, 33 volume percent nitric acid, 70% concentrated, and 50 volume percent deionized water. After etching, the samples were rinsed in running water and the oxide smut produced on the surface by the etching was removed by immersion for 150 seconds in a solution composed of 7.5 volume percent nitric acid, 70% concentrated, 48 volume percent sulfuric acid, 90% minimum concentrated, and 44.5 volume percent sulfuric acid, 90% minimum concentrated, and 44.5 volume percent deionized water. The etched and cleaned samples were rinsed in running water, drained and allowed to dry. They were then placed in a reaction chamber which was evacuated, heated under vacuum to a temperature of 250° C. and then purged with pure nitrogen for one hour. The flow of nitrogen was then replaced by a flow of a mixture of two gases, hydrogen containing 2% silane ($SiH_4$) and hydrogen containing 1% diborane ($B_2H_6$). Their flow was adjusted to 15 cubic centimeters per minute of the borane-hydrogen gas and 385 cubic centimeters per minute of the silane-hydrogen gas, giving a total gas mixture flow through the chamber of 400 cubic centimeters per minute. This flow was maintained for 26 mintues after which time it was replaced by a flow of pure nitrogen. The heat source was then shut off and the samples were allowed to cool down to room temperature under the pure nitrogen flow. The coated samples were assembled by mating the coated surfaces under a pressure of 10 pounds per square inch and heating at a temperature of 1200° C. in vacuum for 1 hour. The bond generated by this process between the two steel samples was entirely absorbed in the material by steel crystals grown across the joint.

EXAMPLE 2

Two pieces of Inconel 617 alloy (22.63% Cr, 12.33% Co, 9.38% Mo, 1.155 Al, 0.76% Fe, 0.27% Ti, 0.15% Si, balance Ni) were bonded together using boron-silicon-hydrogen film coatings deposited on the mating surfaces. The procedure and process parameters applied for film deposition and bonding treatment were identical to those described in Example 1. Also in this case, the bond had been entirely absorbed in Inconel crystals grown across the joint.

EXAMPLE 3

Two plates of fused quartz glass (pure $SiO_2$) were bonded together using boron-silicon-hydrogen film coatings deposited on the mating surfaces. The procedure and processing time and temperature applied for film deposition were identical with those described in Example 1 except cleaning of the surfaces to be coated was confined to a wash with organic solvent and the flow of the coating gases through the deposition chamber was adjusted to 105 cubic centimeters per minute of the borane-hydrogen gas and 210 cubic centimeters per minute of silane-hydrogen gas, to a total flow of 315 cubic centimeters per minute of the gas mixture. The coated samples were assembled as described in Example 1 and heated at a temperature of 1250° C. in an air furnace for 1 hour. The bond generated between the quartz surfaces was completely absorbed in the material. No segregations or voids were found at the joint.

EXAMPLE 4

Two plates of sintered aluminum oxide ($Al_2O_3$) were bonded together using boron-silicon-hydrogen film coatings deposited on the mating surfaces. The procedure and process parameters applied for film deposition and bonding treatment were identical to those described in Example 3. Also in this case, the bond had been absorbed in the material. Only traces of borosilicate glass bond remained at the joint interface in the form of dispersed isolated inclusions.

EXAMPLE 5

Two pieces of sintered silicon carbide (SiC) coated with boron-silicon-hydrogen film were joined together with a 0.003 inch thick aluminum metal foil interposed between the mating surfaces. The mating surfaces of the silicon carbide pieces were coated with the film using procedure and process parameters described in Example 1. The bond between the coated silicon carbide surfaces and the aluminum sandwiched between them was formed by heating the assembly at 700° C. for one hour in vacuum under a pressure of 10 pounds per square inch. The bond was uniform and free of structural defects such as voids and foreign material inclusions. Under a shear load, the bond ruptured within the silicon carbide.

EXAMPLE 6

Structural alloys for thermal protection systems of spacecraft reentering earth atmosphere require on the surface a high emissivity oxide layer with a low catalytic activity to the recombination of dissociated species, such as atomic oxygen and nitrogen, present in the boundary layer during reentry. Several samples of alloy MA 956 (19.30% Cr, 4.28% Al, 0.49% Y, 0.39% Ti, 0.28% Ni, 0.20% O, balance Fe) were lightly grit blasted with 120 mesh alumina and oxidized for 2 hours at 2000° F. in static air. The oxidized surfaces were then coated with boron-silicon-hydrogen film using the procedure described in Example 1. The coated specimens were again oxidized in air and then exposed in an arc-heated wind tunnel to repeated cyclic tests of 0.5 hours each, under simulated reentry conditions at surface temperatures ranging from 1500 to 2300° F.. Catalytic activity of the sample surfaces was assessed by comparing the response of coated and uncoated specimens for up to 5.5 hours of total exposure to test temperature during cycling. While the surface catalysis ratio, expressed as the ratio of net aerothermal heating rate and the catalytic wall heating rate, for uncoated MA 956 alloy surface was close to 1, that of the coated one was only about 0.5

EXAMPLE 7

Development of field effect transistor devices using gallium arsenide semiconductor material is seriously hindered by difficulty in securing a surface passivation layer which would not interfere with free movement of electrical charges at the interface between the dielectic and the semiconductor. Hydrogenated boron-silicon film was used as a transition layer between GaAs and a silicon oxide passivation to eliminate charge injection into the dielectric. Samples of thin wafers of single crystal GaAs were coated with the film using the procedure described in Example 1. About 0.25 micrometer thick layer of silicon oxide was deposited on the top of the film by standard microelectronic art chemical vapor deposition methods. The nature of the interface between the passivation film and the GaAs surface was investigated by slow-sweep 10-KHz capacitance-voltage plots. Most of the best quality oxide dielectrics available in the current state of the art display a clockwise hysteresis in the C-V curves which is attributed to charge injection into the oxide. The hysteresis, and, therefore, the charge injection it indicates, were eliminated in the samples with the silicon oxide dielectric deposited on the top of the hydrogenated boron-silicon film.

We claim:

1. A method for bonding two substrate surfaces selected from the group consisting of metals and ceramics comprising the steps of:
   (a) forming a solid hydrogenated boron-silicon alloy film on at least one of said surfaces;
   (b) mating the surfaces to be bonded; and
   (c) heating the mated surfaces at a temperature sufficient to expell hydrogen from said film and to react the resulting solid boron-silicon alloy film with the mated surfaces to form a liquid reaction product which chemically interacts with the mated surfaces to form a bond.

2. A method of claim 1 wherein said solid boron-silicon alloy film reacts with metals and ceramics to form, respectively, liquid ternary metal-boron-silicon eutectic alloys and liquid borosilicate glasses.

3. The method of claim 1 wherein said liquid reaction product is at least partially absorbed in said substrates.

4. The method of claim 1 wherein said liquid reaction product wets and forms a surface bond with said substrate surfaces.

* * * * *